(12) United States Patent
Ito et al.

(10) Patent No.: US 7,641,462 B2
(45) Date of Patent: Jan. 5, 2010

(54) APPARATUS FOR PRODUCING MULTI-LAYER FILM

(75) Inventors: Koju Ito, Kanagawa (JP); Hidekazu Yamazaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 820 days.

(21) Appl. No.: 11/091,424

(22) Filed: Mar. 29, 2005

(65) Prior Publication Data

US 2005/0214472 A1    Sep. 29, 2005

(30) Foreign Application Priority Data

Mar. 29, 2004    (JP)    .............................. 2004-094334

(51) Int. Cl.
   *B29C 47/06*    (2006.01)
   *B29C 47/14*    (2006.01)
(52) U.S. Cl. .............. 425/133.5; 425/382.3; 425/382.4; 425/462
(58) Field of Classification Search ............ 264/173.16, 264/172.19, 216, 234, 232; 425/131.1, 109, 425/131, 198, 305, 375, 133.5, 382.3, 382.4, 425/462, 465; 427/420
   See application file for complete search history.

(56) References Cited

U.S. PATENT DOCUMENTS

| | | | | | |
|---|---|---|---|---|---|
| 3,687,589 | A | * | 8/1972 | Schrenk | 425/131.1 |
| 4,289,560 | A | * | 9/1981 | Simons | 156/244.18 |
| 4,839,131 | A | * | 6/1989 | Cloeren | 264/173.12 |
| 2002/0005517 | A1 | * | 1/2002 | Inoue | 257/66 |
| 2004/0104496 | A1 | * | 6/2004 | Arai et al. | 264/28 |

FOREIGN PATENT DOCUMENTS

JP    2002-221620 A    8/2002

* cited by examiner

*Primary Examiner*—Robert B Davis
*Assistant Examiner*—Joseph Leyson
(74) *Attorney, Agent, or Firm*—Sughrue Mion, PLLC

(57) ABSTRACT

In a joining section there are columnar distribution pins, on whose periphery a groove is formed. A size of the groove is strictly determined. A first dope and a third dope are fed through the respective grooves such that a width of each dope is controlled. Thereafter, the surface and third dopes are joined with an second dope. Thus a multi-layer stream is obtained and cast through a die lip of a casting die for forming a casting film having a multi-layer structure. The casting film is dried and thus a multi-layer film is obtained.

4 Claims, 7 Drawing Sheets

JOINING

DISCHARGE FROM DIE LIP

JOINING

DISCHARGE FROM DIE LIP

JOINING

DISCHARGE FROM DIE LIP

APPARATUS FOR PRODUCING MULTI-LAYER FILM

BACKGROUND OF THE INVENTION

1. Field of the Invention

The present invention relates to an apparatus and a method of producing a multi-layer film.

2. Description Related to the Prior Art

Recently, a demand of a transparent thin film increases since the thin film is used as an optical film, such as a protective film for a polarizing filter of a liquid crystal display, an optical compensation film in an optical retardation filter and the like. These optical films are required to have a low optical anisotropy, a smoothness, a high resistance and the like, and preferably produced from cellulose triacetate.

In order to produce the optical films, a film producing apparatus for producing a multi-layer film is preferably used, to which a method of casting a multi-layer solution is applied. In the film producing apparatus, a higher viscosity polymer solution and a lower viscosity polymer solution are fed through respective feed paths and joined in a joining section of a feed block to form the multi-layer flow in which the higher and lower viscosity polymer solutions flow in parallel. The multi-layer solution is discharged from a casting die and cast onto a support so as to form a casting film having a multi-layer structure. The casting film is peeled from the support. Then edge portions of the casting film in a widthwise direction is slit off or trimmed off, and a middle portion of the casting film is obtained as a production film having a multi-layer structure.

Recently, in the joining section of the feed block, the higher viscosity polymer solution is often sandwiched between the lower viscosity polymer solutions. In this case, the casting film has a multi-layer structure constructed of an inner layer (or intermittent layer) formed from the higher viscosity polymer solution and outer layers (or a surface layer and a back layer) formed from the lower viscosity polymer solution.

In the prior art, as shown in FIG. 12A, a first solution 100 and second solutions 101 are joined to form the multi-layer flow in which the first and second solutions 100, 101 have the same width. However, as shown in FIG. 12B, the first and second solutions 100, 101 in multi-layer flow is simultaneously cast to form a casting film 104 of a multi-layer structure with an encapsulation in which outer layers 102 of low viscosity cover an inner layer 103 of high viscosity. In this case, edge portions of the casting film 104 contain a large amount of the solvent, and therefore often cannot be dried enough. Thus when the peeling is made, some parts of the edge portions remains on the support, and the casting film 104 is torn from the edge portions, which causes the stop of film production. Further, when the drying is made, voids are generated in the edge portions. Thus the casting film is torn from the part in which the voids are generated, and the film production stops.

In an apparatus for producing a multi-layer film disclosed in the Japanese Patent Lai-Open Publication No. 2002-221620, a joining section of a feed block is provided with a distribution pin on which a groove is formed, and a plan of the groove has a trapezoidal shape. In the groove the outer solutions is fed, and thus as shown in FIG. 13A, the width of the outer solutions 105 becomes smaller than the inner solutions 106 after the joining. Note that the widths of the groove can be changed by rotating the distribution pin.

However, even if the distribution pin in which the groove is formed as described in the above publication is used, the covering phenomena occurs, and there are acceptable covering phenomena and unacceptable covering phenomena. Especially when the production speed is made higher so as to increase the productivity, the unacceptable covering phenomena occurs, and the remaining part of the casting film on the support after the peeling becomes larger. Therefore, it is necessary to determine a size of the groove and a width of the solution for forming the outer layer strictly.

Further, when the trapezoidal grooves are formed as described in the above Publication, as shown in FIG. 13B a middle part of the discharged solution 107 for forming the outer layer becomes much thinner, and therefore the thickness becomes nonuniform in the widthwise direction. Furthermore, since a depth of the groove depends on the rotational position of the distribution pin, a difference of the flow speed between the inner solution and the outer solutions in the joining section increases depending on the depth of the groove. Thus the inner and outer solutions are unstably fed at the joining, and therefore the thickness of each layer becomes nonuniform in the feeding direction.

SUMMARY OF THE INVENTION

An object of the present invention is to provide an apparatus and a method of producing a multi-layer film, in which a peeling is made without a remaining part on the support.

Another object of the present invention is to provide an apparatus and a method of producing a multi-layer film in which each layer is uniform.

In order to achieve the object and the other object, an apparatus for producing a multi-layer film includes plural feed path for respectively feeding a high viscosity polymer solution therein and a low viscosity polymer solution whose viscosity is lower than the high viscosity polymer solution, a feed block for joining the feed paths so as to feed a multi-layer stream in which the high viscosity polymer solution and the low viscosity polymer solution are positioned in parallel, and a casting die for extending a width of the multi-layer polymer solution and casting the multi-layer polymer solution through a die lip onto a support so as to form a casting film having a multi-layer structure. The feed block includes a distribution pin, a groove formed on the distribution pin, and an exit having a width Wa and a depth Da. The groove controls a width of the low viscosity polymer solution when the low viscosity polymer solution is fed in the groove. The multi-layer polymer solution is fed through the exit into the casting die. A width of the casting film is described as Wb, a width of a production portion of the casting film is as Wc, a thickness of a layer formed from the high viscosity polymer film in the casting film is as Df, and a thickness of a layer formed from the low viscosity polymer film in said casting film is as Dg. The width Wd and a depth Dd of the groove satisfy following formulae:

$$0.6 \times (Wa \times Wc/Wb) < Wd < 1.14 \times (Wa \times Wc/Wb) \text{ and}$$

$$0.5 \times (Da \times Dg/Df) < Dd < 3.2 \times (Da \times Dg/Df).$$

Preferably, the distribution pin is columnar, and the groove is formed on periphery of the distribution pin. Further, the distribution pin is rotatable around a central axis of a bottom thereof. The width Wd of the groove varies in a rotational direction of the distribution pin and a rotation of the distribution pin is made so as to change the width Wd of the groove for controlling the width of the low viscosity polymer solution.

Furthermore, a groove is formed in a middle of the groove, and a width We and a depth De satisfy following formulae:

$$0.05Wd < We < 0.15Wd, \text{ and}$$

$$0.15Dd < De < 1.5Dd.$$

Preferably, the multi-layer film is a cellulose triacetate film.

In a method of producing a multi-layer film of the present invention, a feed block is supplied through respective feed paths with a high viscosity polymer solution and a low viscosity polymer solution whose viscosity is lower than that of the high viscosity polymer solution. The low viscosity polymer solution is fed through a groove on a distribution pin in the feed block, so as to control a width of the low viscosity polymer solution. The high viscosity polymer solution and the low viscosity polymer solution are joined, so as to obtain a multi-layer polymer solution in which the high viscosity polymer solution and the low viscosity polymer solution are positioned in parallel. The multi-layer polymer solution is fed through an exit of the feed block into a casting die. A width of the multi-layer polymer solution is extended in the casting die, and cast through a die lip of the casting die onto a support so as to form a casting film having a multi-layer structure. The casting film is dried to obtain the multi-layer film. A width of the casting film is described as Wb, a width of a production portion of the casting film is as Wc, a thickness of a layer formed from the high viscosity polymer film in the casting film is as Df, and a thickness of a layer formed from the low viscosity polymer film in said casting film is as Dg. The width Wd and a depth Dd of the groove satisfy following formulae:

$$0.6 \times (Wa \times Wc/Wb) < Wd < 1.14 \times (Wa \times Wc/Wb) \text{ and}$$

$$0.5 \times (Da \times Dg/Df) < Dd < 3.2 \times (Da \times Dg/Df).$$

According to the present invention, it is prevented that part of the casting film remains on the support after the peeling. Further, each layer the produced multi-layer film has a uniform thickness.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

[Polymers]

As examples of polymers as raw materials of a multi-layer film to be used in the present invention, there are lower fatty acid ester of cellulose (for example cellulose triacetate and the like), polyolefines (for example norbornene type polymers and the like), polyamides (for example aromatic polyamides and the like), polysulfones, polyethers (including for example polyethersulfones, polyetherketones and the like), polystyrenes, polycarbonates, polyacrylic acids, polyacrylamides, polymethacrylic acids (for example polymethylmethacrylate and the like), polymethacrylaamides, polyvinylalcohols, polyureas, polyesters, polyurethanes, polyimides, polyvinylacetates, polyvinylacetals (for example polyvinylformal, polyvinylbutylal and the like), and proteins (for example gelatines and the like). However, the polymers are not restricted in them. Preferably among them are the lower fatty acid esters of cellulose and especially the cellulose triacetate for the raw material of a film for optical use.

[Solvent]

A polymer solution (hereinafter dope) for producing the multi-layer film can be prepared by dissolving the above polymers to an adequate solvent. The compounds of the solvent may be organic compounds or inorganic compounds. However, the organic compounds are preferable. As the organic compounds for the solvent, there are halogenated hydrocarbons (for example dichloromethane and the like), alcohols (for example methanol, ethanol, butanol and the like), esters (for example methyl formate, methyl acetate, and the like), ethers (for example dioxane, dioxolane, diethylether and the like), and ketones (for example acetone, methylethylketone, cyclohexanone and the like). However, the compounds are not restricted in them.

[Preparation of Dope]

In preparing the dope, there are several methods already known, for example, a method in which the polymers are dissolved to the solvent, or a method in which a cool-dissolving method is used, namely, the polymers is swollen in the solvent and the swelling solution is cooled to at most −10° C. and heated to at least 0° C. so as to dissolve the polymers. A viscosity of the solution is usually in the range of 3 to 300 Pa·s (measured at 35° C.). The dope for intermittent layer has a higher concentration and a higher viscosity than the dope for outer layer. Further additives may be added to the dope. As the additives, there are several sorts of already known plasticizers (triphenylphosphate, biphenyldiphenylphosphate, diethylphthalate, polyester polyurethane elastomer and the like). Further, if necessary, ultraviolet absorbing agents, deterioration inhibitors, lubricant agents, release agent that are already known may be added as the additives. These additives may be added in any steps in the dope preparation.

[Producing Multi-layer Film]

Figure 1:
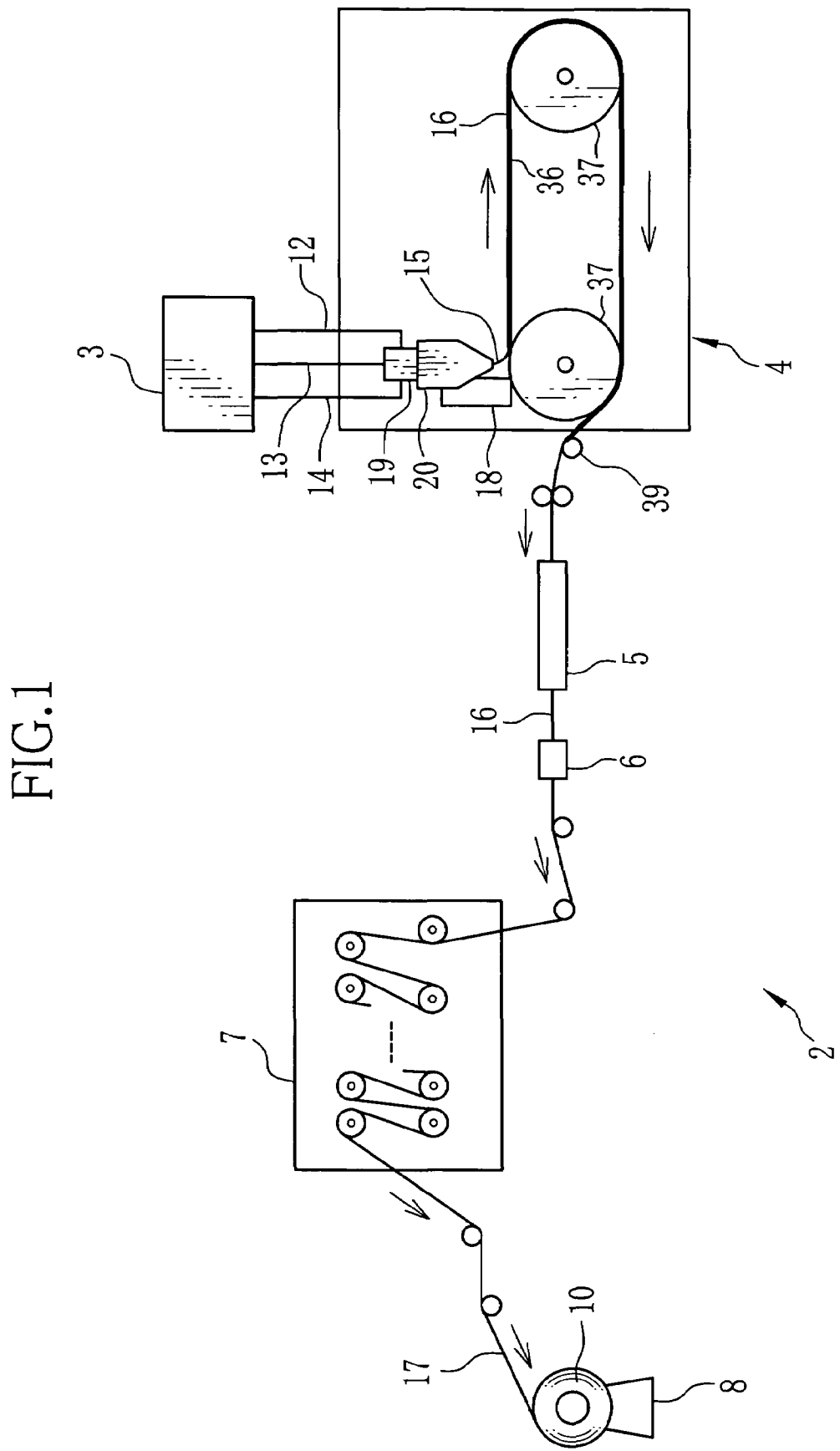
FIG. 1 is a schematic diagram of a film production line.

As shown in FIG. 1, a film production line 2 is constructed of a dope supplying apparatus 3, a film producing apparatus 4, a tenter device 5, an edge slitting device 6, an drying apparatus 7, and a winding apparatus 8.

The dopes prepared in a dope preparation line are fed to the dope supplying apparatus 3 in which each dope are kept uniform. Then the dope supplying apparatus 3 supplies the dopes to the film producing apparatus 4, while the flow rate is controlled with use of a pump. Note that the dopes fed from the dope supplying apparatus 3 is a first dope 12 for forming a surface layer of the casting film, a second dope 13 for forming an intermittent layer, and a third dope 14 for forming a back surface layer. In the film producing apparatus 4, the first-third dopes 12-14 are joined to form a multi-layer stream 15. Then the multi-layer stream 15 is cast to form a casting film 16 having a multi-layer structure. The tenter device 5 stretches the casting film 16 so as to regulate the width of the casting film 16. The edge slitting device 6 slits off side edge portions of the casting film 16. The drying apparatus 7 dries the casting film 16. After the drying, the casting film 16 is wound as a multi-layer film 17 into a film roll 10 by the winding apparatus 8.

Figure 2:
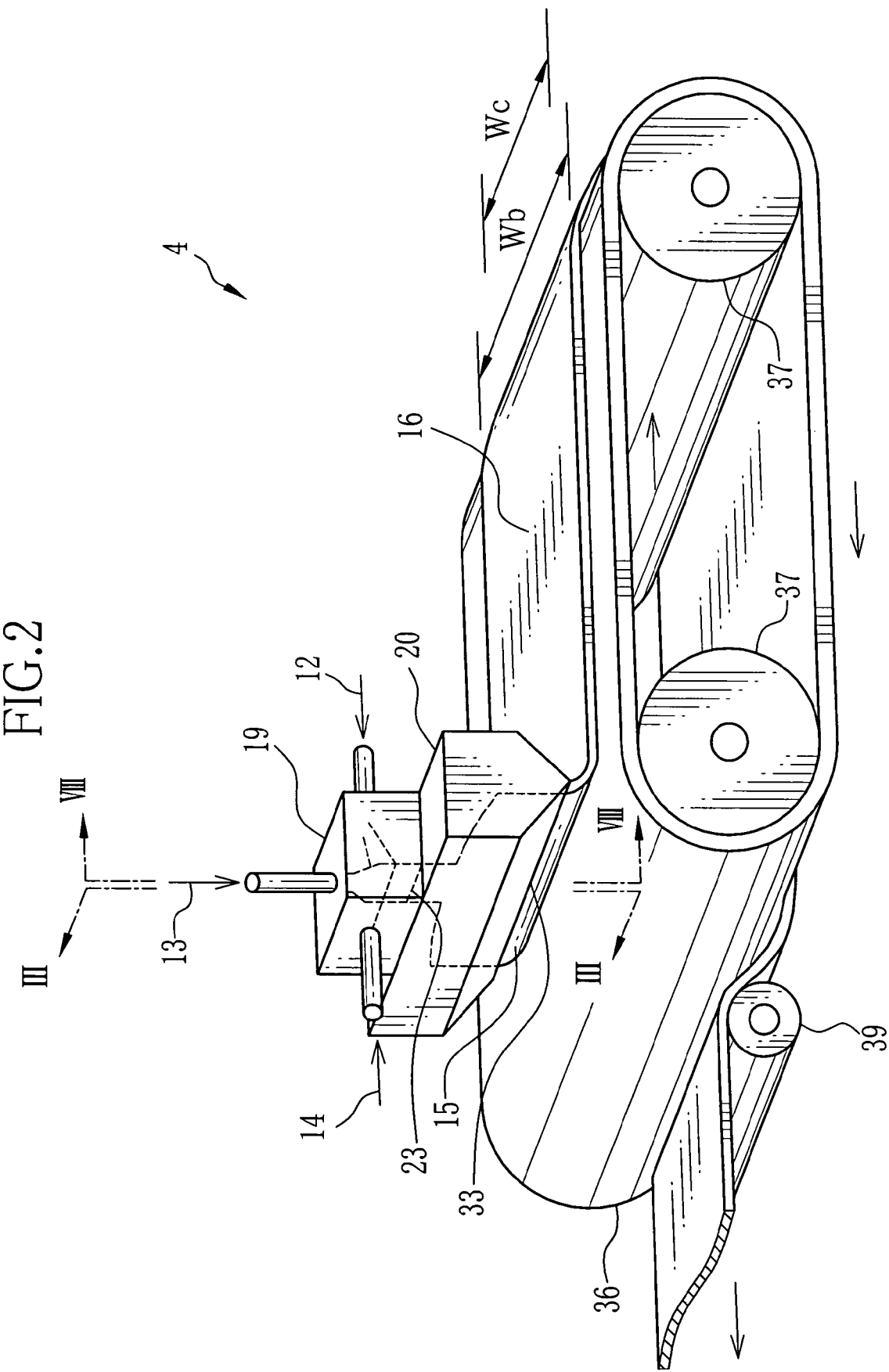
FIG. 2 is a perspective view of a film producing apparatus for producing a multi-layer film.

As shown in FIG. 2, the film producing apparatus 4 is constructed of a feed block 19, a co-casting die 20, a decompression chamber 18, a belt 36 and rollers 37.

Figure 3:
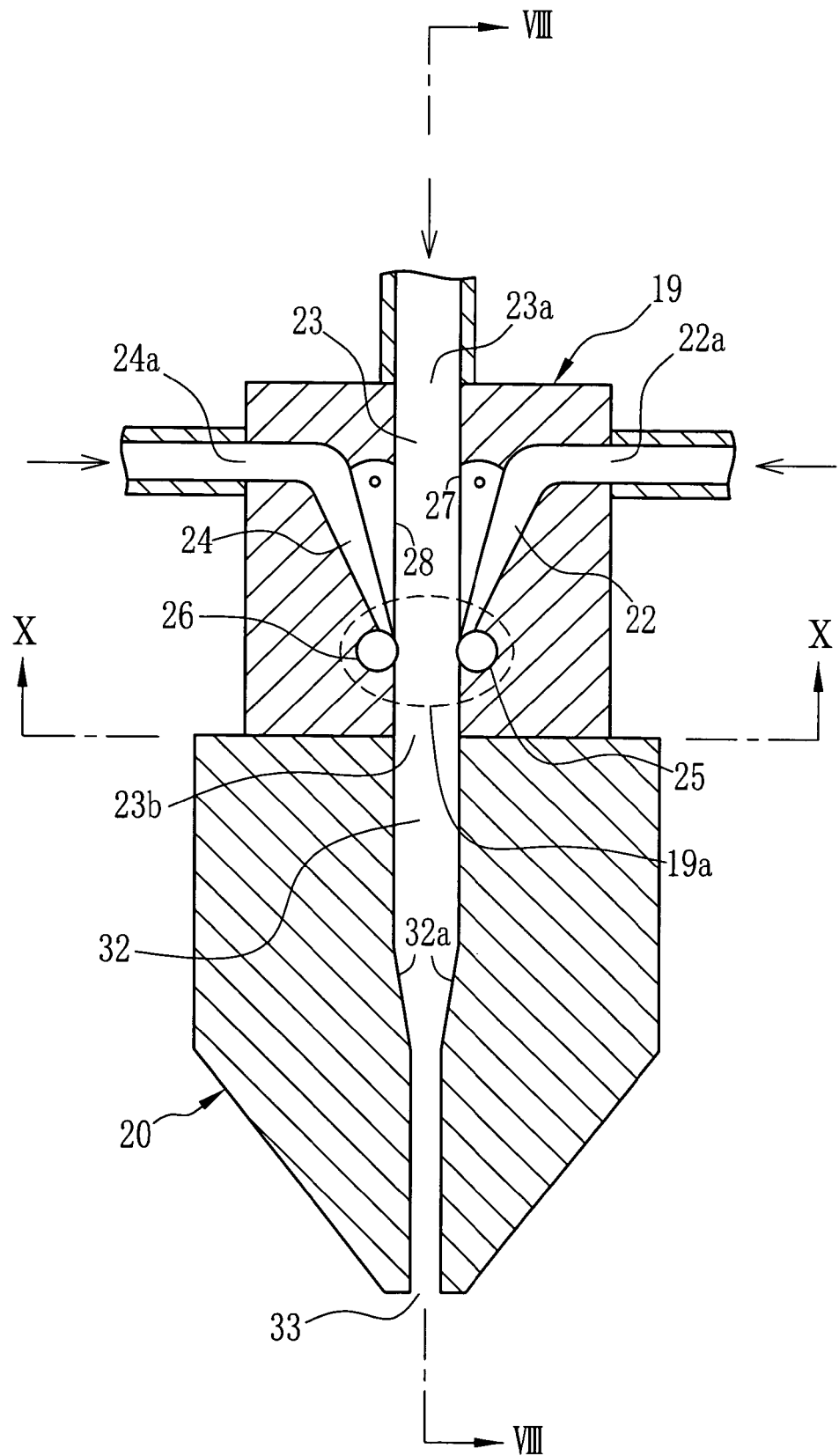
FIG. 3 is a sectional view of a feed block and a casting die along a line III-III in FIG. 2.

To the feed block 19 of the film producing apparatus 4 are fed the first dope 12, the second dope 13, and the third dope 14. As shown in FIG. 3, the feed block 19 is a rectangular parallelepiped and is provided with three feed paths 22-24. The feed path 23 extends vertically and downwardly, and joined with the feed paths 22, 24 in a joining section 19a. On a top and sides of the feed block 19 are formed entrances 22a, 23a, 24a of the respective feed paths 22, 23, 24. On a bottom of the feed block 19 is formed an exit 23b of the feed paths 22, 23, 24. The dopes 12-14 are respectively fed into through the entrances 22a, 23a, 24a.

In the joining section 19a of the feed block 19, there are distribution pins 25, 26 and vanes 27, 28. As described later in detail, the distribution pins 25, 26 are rotatable around an axis through central points of side faces. The distribution pin 25 and the vane 27 are provided on the feed path 22 just before joining with the feed path 23. The distribution pin 26 and the vane 28 are provided on the feed path 24 just before the position at which the feed paths 23 and 24 are joined.

Figure 4:
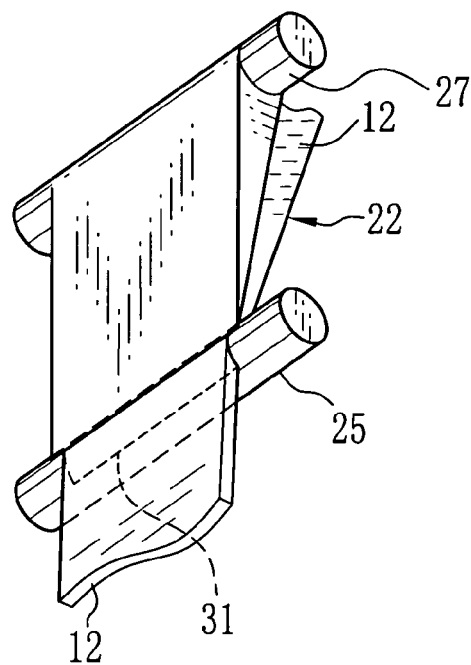
FIG. 4 is perspective view of a distribution pin and a vane in the feed block.
Figure 5:
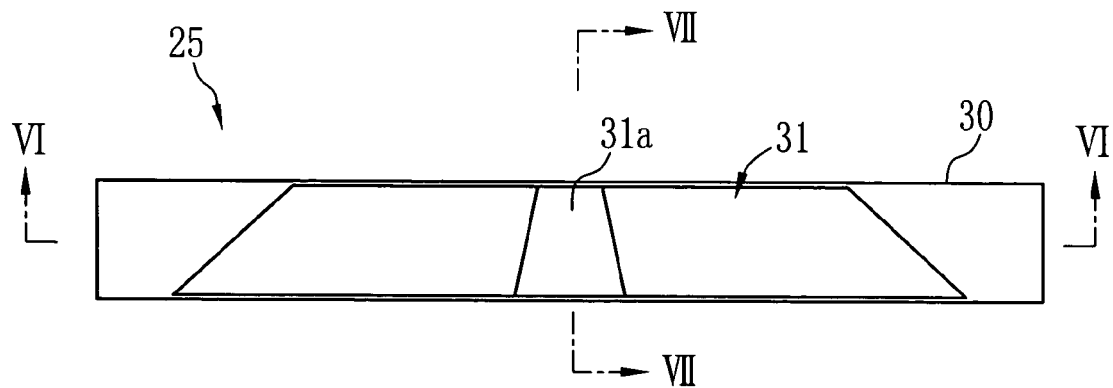
FIG. 5 is a side view of a distribution pin.
Figure 6:
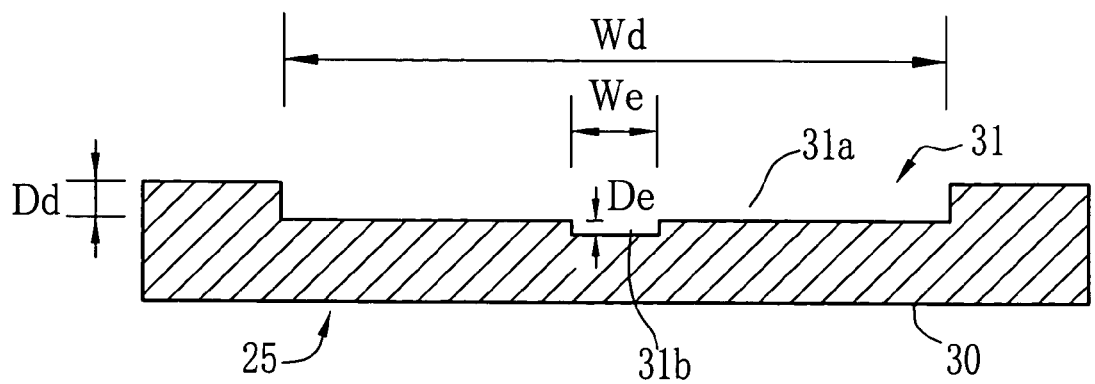
FIG. 6 is a sectional view of the distribution pin along a line VI-VI in FIG. 5.
Figure 7:
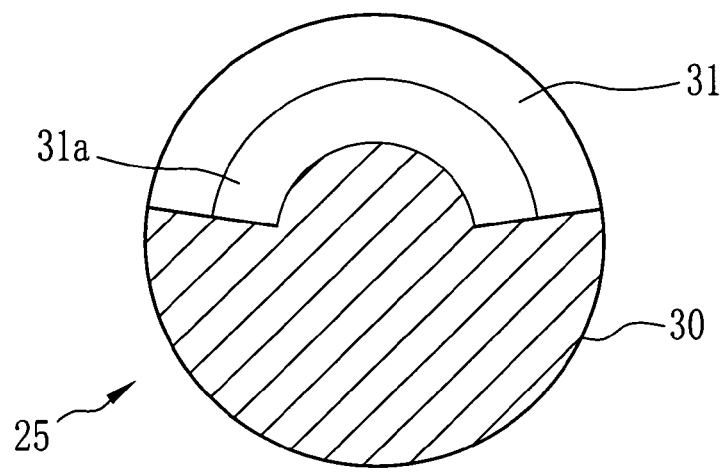
FIG. 7 is a sectional view of the distribution pin along a line VII-VII in FIG. 5.

The distribution pin 25 is columnar, and made to be long in the widthwise direction of the first dope 12. As shown in FIG. 4, a groove 31 is formed on a periphery of the distribution pin 25, and the first dope 12 flows in the groove 31. As shown in FIGS. 5-7, the groove 31 has a first groove area 31a and a second groove area 31b. The first dope 12 flows while the width and the depth thereof are regulated.

As shown in FIG. 5, the first groove area 31a is nearly trapezoidal, and therefore a width of the first groove area 31a is not constant but smaller in the upper area of this figure. Further, the depth of the first groove area 31a is constant excepting the second groove area 31b. Note that the depth of the first groove area 31a may change in a rotational direction of the distribution pin.

Further, the second groove area 31b formed in a middle of a bottom of the groove 31 is trapezoidal, and the width of the second groove area 31b is not constant but smaller in a similar manner to the first groove area 31a, namely, in the upper area of this figure. In this embodiment, the depth of the second groove area 31b is constant in a rotational direction of the distribution pin 25. However, the depth of the second groove area 31b may be varied in the rotational direction of the distribution pin 25.

A size of the groove 31 of the distribution pin 25 is restricted, and the groove 31 is formed in an acceptable range of the restriction. The acceptable range will be explained in detail.

When the first dope 12 flows in the groove 31, the width and a depth of the first dope 12 is controlled. The first dope 12 of the depth and the width joins to the second dope 13. When the distribution pins is rotated, the width of the first dope 12 changes. As shown in FIG. 3, the vane 27 is disposed in an upstream side from the distribution pin 25 and has a cuneiform. The rotation displacement of the vane 27 controls the thickness of a flow of the first dope 12.

The distribution pin 26 and the vane 28 have the same structure as the distribution pin 25 and the vane 27, so as to determine the width and the depth of the third dope 14 and control the flow rate thereof. The multi-layer stream 15 constructed of the dopes 12-14 is discharged through the exit 23b.

Figure 8:
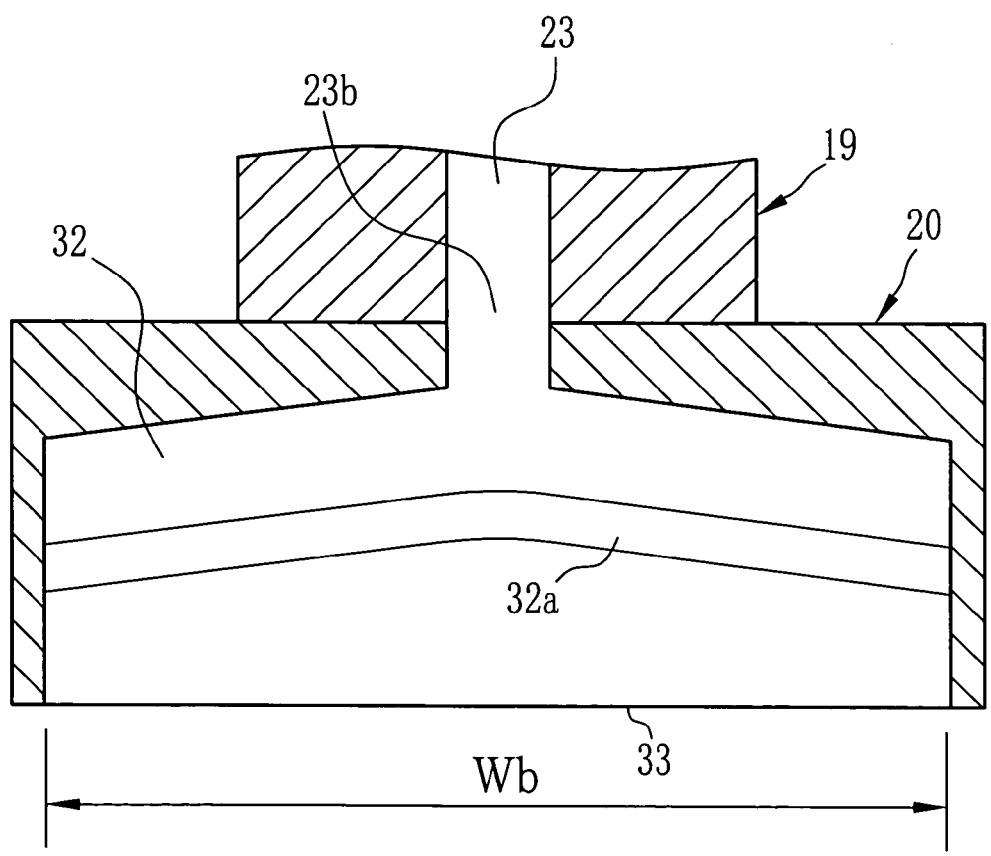
FIG. 8 is a sectional view of the casting die along a line VIII-VIII of FIG. 2.

As shown in FIGS. 3, 8, a feed path 32 is formed in the co-casting die 20. The feed path 32 extends in the widthwise direction of the co-casting die 20 such that the width of the feed path 32 may be larger downwards in this figure. Further, walls of the feed path 32 have inclinations 32a such that the thickness of the multi-layer stream 15 may be smaller. The multi-layer stream 15 fed from the feed block 19 is extended in the widthwise direction in the feed path 32 and then discharged from a die lip 33 provided at the top of the co-casting die 20. The decompression chamber 18 (see, FIG. 1) keeps to a predetermined value the pressure of an air in a back side from the multi-layer stream discharged from the die lip 33. Thus as shown in FIG. 2, the multi-layer stream 15 is cast onto the belt 36 in a situation that the shape is stable.

The belt 36 is supported by the rollers 37 which are rotated by a motor (not shown). The multi-layer stream 15 cast through the die lip 33 from the co-casting die 20 forms the casting film 16 on the belt 36. Then the casting film 16 is conveyed on the belt 36 moving in accordance with the rotation of the rollers 37. Note that a drum may be used in the casting device, instead of the casting belt and the rollers.

Figure 9:
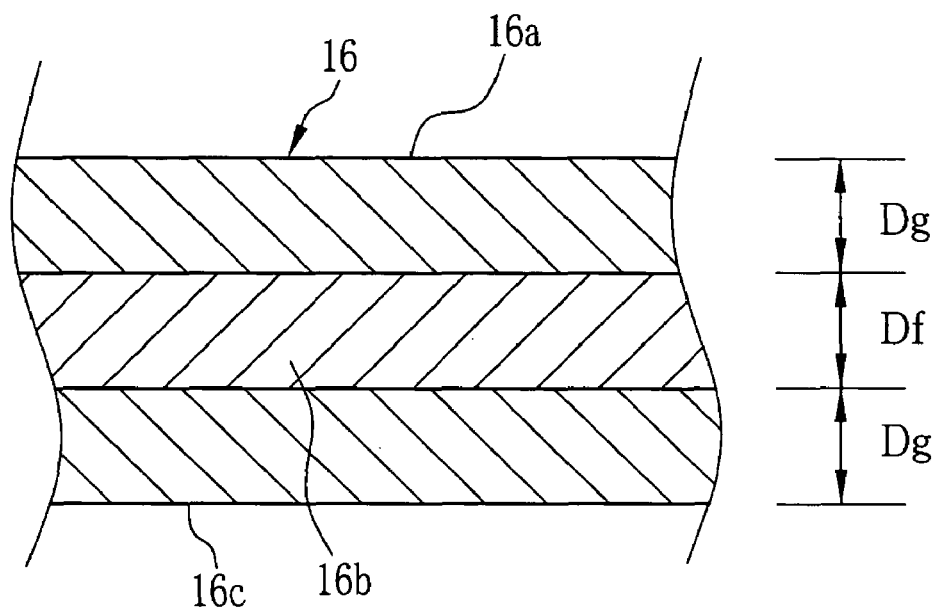
FIG. 9 is a sectional view of a casting film having a multi-layer structure.

As shown in FIG. 9, the casting film 16 having the multi-layer structure is constructed of a surface layer (or exposure layer) 16a, an intermittent layer 16b, and a back layer 16c. The back layer 16c is disposed on the belt 36. The casting film 16 is peeled from the belt 36 with use of the peeling roller 39. The casting film 16 is transported to the tenter device 5 and then to the edge slitting device 6. In the edge slitting device 6, both edge portions of the casting film 16 is slit off or trimmed off, and a production portion of the casting film 16 is transported to the drying apparatus 7.

In followings, the acceptable range of a size of the groove 31 of the distribution pin 25 is explained. Note that since the distribution pin 26 has the same structure as the distribution pin 25, the explanation of the distribution pin 26 is omitted. The acceptable range of the size of the groove 31 is determined in relation to other elements constructing the film producing apparatus 4. In this embodiment, the acceptable ranges of the widths and the depths of the first groove area 31a and the second groove area 31b are determined.

Figure 10:
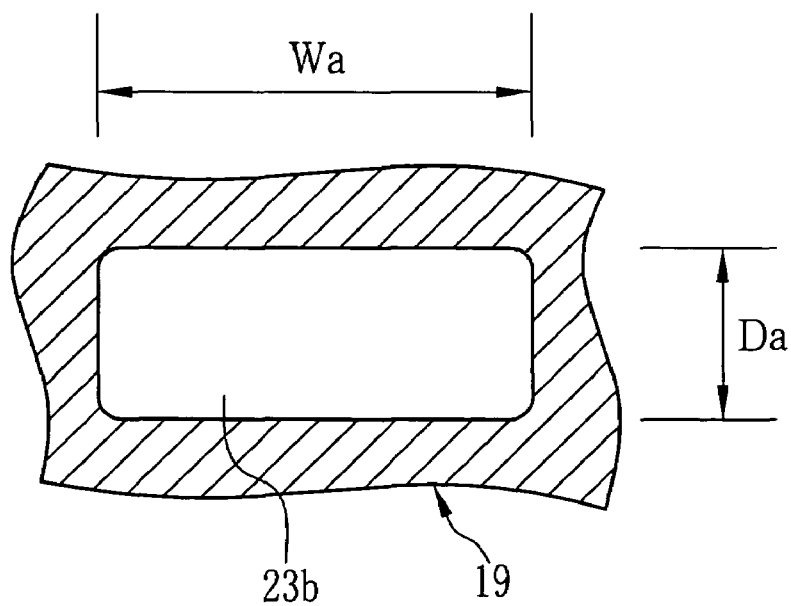
FIG. 10 is a sectional view of an exit of the feed block of FIG. 3.

As shown in FIG. 10, the exit 23b of the feed block 19 has the width Wa and the depth Da. Further, the width of the casting film 16 to be formed on the belt 36 is described as Wb (FIG. 2), the width of the production portion of the casting film 16 is as Wc (FIG. 2), the thickness of the intermittent layer 16b is Df (FIG. 9), and the thickness of the surface and back layers 16a, 16c is as Dg. In this embodiment, the thickness of the surface and back layers 16a, 16c is the same. However, it may be different in the present invention. For example, when the thickness of the back layer 16c is describes as Dh instead of Dg, the groove of the distribution pin 26 may be designed from the following formulae in which the value Dh is substituted for the value Dg.

A width Wd of the first groove area 31a (FIG. 6) satisfies following $1^{st}$ conditions:

$$Wd = \alpha \times (Wa \times Wc/Wb)$$

However, $0.6 < \alpha < 1.14$

From these formulae (condition 1) is determined the acceptable range of the width Wd of the first groove area 31a. The value α is particularly preferably 0.65<α<1.1.

The formulae of the $1^{st}$ conditions are resolved according to the value Wd, the following formula is obtained:

$$0.6\times(Wa\times Wc/Wb)<Wd<1.14\times(Wa\times Wc/Wb)$$

In α≦0.6, the width of the surface layer 16a and the back layer 16c in the casting film 16 is too small, and the width of the production area of the multi-layer stream 15 become too small. In α≧1.14, the width of the surface layer 16a and the back layer 16c is in the casting film 16 too large, which sometimes causes the covering phenomenon. In this embodiment, the width Wd of the first groove area 31a is determined in the range satisfying the $1^{st}$ conditions, and thus the covering phenomena doesn't occur. In this embodiment, the distribution pin 25 is rotated to change the width Wd of the first groove area 31a.

The depth Dd of the first groove area 31a (FIG. 6) satisfies a following $2^{nd}$ conditions:

$$Dd=(\beta\times Da\times Dg)/Df$$

However, 0.5<β<3.2

From the $2^{nd}$ conditions is determined the acceptable range of the depth Dd of the groove 31. The value β is particularly preferably 0.6<β<3, and especially 0.7<β<2.5.

The formulae of the $2^{nd}$ conditions are resolved according to the value Dd, the following formula is obtained:

$$0.5\times(Da\times Dg/Df)<Dd<3.2\times(Da\times Dg/Df)$$

The flow rate is kept constant by the pump, independent from the depth Dd. Namely, in the joining section 19a, if the depth Dd is large, the flow velocity of the first dope 12 is lower than that of the second dope 13, and if the depth Dd is small, the flow velocity of the first dope 12 is higher than that of the second dope 13.

At the joining, the flow velocities of the first dope 12 and the second dope 13 are preferably almost the same. However, in β≦0.5, the flow velocity of the first dope 12 is larger than that of the second dope 13, and in β≧3.2, the flow velocity of the first dope 12 is smaller than that of the second dope 13. At the joining, if the flow velocity of each dope 12, 13 are too large, the flow at the joining becomes unstable, which causes the thickness nonuniformity of the dopes 12, 13 in the flowing direction. In this embodiment, the depth Dd of the groove 31 is determined in the range satisfying the $2^{nd}$ conditions, and since the flow velocities of the first dope 12 and the second dope 13 become almost the same, the flow at the joining becomes stable. Therefore, the thickness difference between the dopes 12, 13 does not change in the feeding direction, and the surface layer 16a and the intermittent layer 16b in the casting film 16 of the multi-layer structure have the uniform thickness.

The width We of the second groove area 31b (FIG. 6) satisfies following $3^{rd}$ conditions:

$$We=p\times Wd$$

However, 0.05<p<0.15

From the $3^{rd}$ conditions can be determined the acceptable range of the width We of the second groove area 31b. The coefficient p is particularly preferably 0.065<p<0.11.

The depth De of the second groove area 31b (FIG. 6) satisfies following $4^{th}$ conditions:

$$De=q\times Dd$$

However, 0.15<q<1.5

From thee $4^{th}$ conditions can be determined the acceptable range of the depth De of the second groove area 31b. The coefficient q is particularly preferably 0.5<q<1.2.

The formulae of the $3^{rd}$ and $4^{th}$ conditions are respectively resolved according to the values We, De, the following formulae are obtained:

$$0.05Wd<We<0.15Wd$$

$$0.15Dd<De<1.5Dd$$

In p≦0.05 or in q≦0.15, the surface layer 16a or the back layer 16c of the casting film 16 has a retraction in a middle area in the widthwise direction.

In p≧0.15 or q≧15, the surface layer 16a or the back layer 16c of the casting film 16 has a protrusion in a middle area. In this embodiment, the width We and depth De of the second groove area 31b are determined in the respective ranges satisfying the $3^{rd}$ and $4^{th}$ conditions. Therefore, as shown in FIG. 11, the thickness of each layer in the casting film 16 is uniform.

Figure 11A:
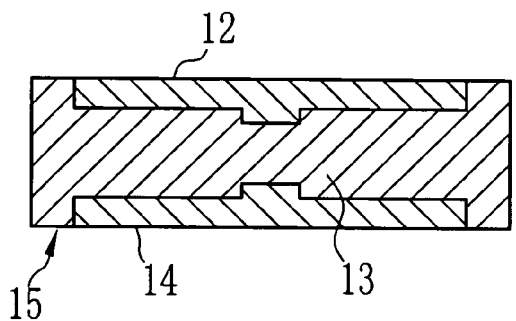
FIG. 11A is a sectional view of a multi-layer stream of a dope.
Figure 11B:
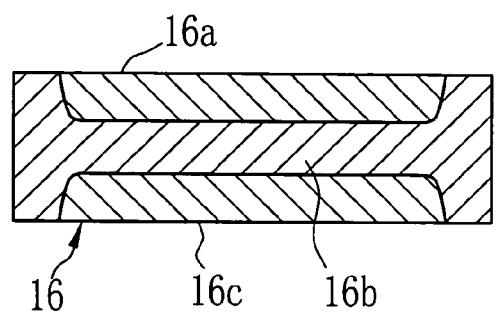
FIG. 11B is a sectional view of a casting film.
Figure 12A:
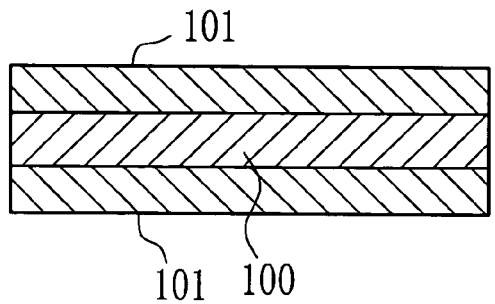
FIG. 12A is a sectional view of a multi-layer stream of a dope in a prior art.
Figure 12B:
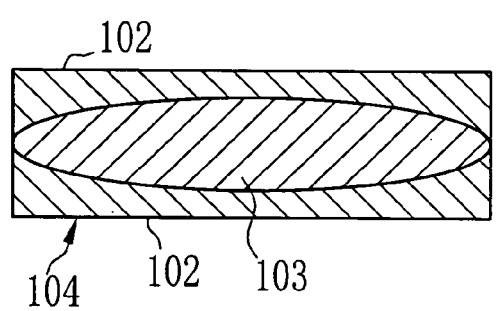
FIG. 12B is a sectional view of a casting film in a prior art.
Figure 13A:
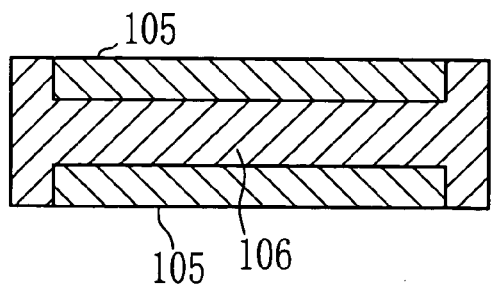
FIG. 13A is a sectional view of a multi-layer stream of a dope in a prior art.
Figure 13B:
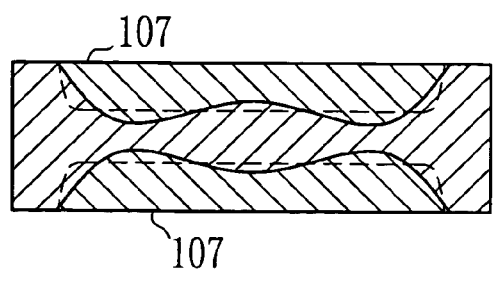
FIG. 13B is a sectional view of a casting film in a prior art.

In the preset invention, the acceptable ranges of the size of the groove 31 of the distribution pin 25 are determined, and the groove 31 is formed in the acceptable ranges. Thus the thickness of the outer dopes fed in the groove 31 can be controlled. Accordingly, as shown in FIGS. 11A & 11B, the multi-layer stream 15 forms the casting film 16 having the multi-layer structure such that the thickness of each layer in the production portion of may be uniform. The acceptable ranges are determined in a relation to other elements constructing the film producing apparatus 4. Therefore the acceptable ranges are versatile, and the producing condition can be changed smoothly.

In this embodiment, the multi-layer stream 15 has the surface layer 15a and the back surface layer 15c. However, the multi-layer stream 15 may have only one surface layer. Note that the multi-layer film to be produced is adequately used for the optical film or the protective film for the polarizing filter. Note that the groove 31 of the distribution pin 25 may has any shape in the acceptable ranges described above.

[Experiment]

The cellulose triacetate film was produced with use of the film producing apparatus 4 in FIG. 2. The remaining part of the casting film 16 after the peeling in the film production process and the thickness unevenness of the produced film were estimated.

In the second dope 13 used for the film production, 100 pts.wt. of cellulose triacetate (degree of acetylation of 60.9%) was used as the raw material, and added into the mixture solvent (methylene chloride of 300 pts.wt. and methanol of 65 pts.wt.). To this mixture of the polymer and the mixture solvent was added as additives the plasticizer (triphenylphosphate of 7.8 pts.wt. and biphenyldiphenylphosphate 3.9 pts.wt.) and the UV-absorbing agent of 1.0 pts.wt. Thus the dissolution was made to prepare the second dope 13. About the physical property of the second dope 13, the viscosity at 34° C. was 50 Pa·s, and the content of the solid materials was 23.8%.

Further, in the first dope 12 and the third dope 14, 87 pts.wt. of cellulose triacetate (produced from the wood pulp, degree of acetylation of 60.9%) was used as the raw material, and added into the mixture solvent (methylene chloride of 300 pts.wt. and methanol of 65 pts.wt.). To this mixture of the polymer and the mixture solvent was added the lubricants (triphenylphosphate of 6.8 pts.wt. and biphenyldiphenylphosphate 3.4 pts.wt.) and the UV-absorbing agent of 0.9 pts.wt. Thus the dissolution was made to prepare the surface and third dopes 12, 14. About the physical property of the surface and third dopes 12, 14, the viscosity at 34° C. was 36 Pa·s, and the content of the solid materials was 20.8%.

The width Wa and the depth Da of the exit 23b of the feed block were 100 mm and 40 mm. The casting width Wb was 2000 mm, and the width Wc of the production portion was 1340 mm. The thickness Df of the intermittent layer 16b was 74 μm, and the thickness Dg of the surface and back layers 16a, 16c were 3 μm.

About the distribution pins 25, 26, the value a was 0.5, 0.8, 1.1, 1.4, (in this order, the width Wd of the first groove area was 34 mm, 54 mm, 74 mm, 94 mm), and the value β was 1.0 (in this case, the depth Dd of the first groove area was 1.6 mm). Further, the coefficient p and the coefficient q were 0.08 and 0.5. The results of the experiment under these conditions are shown in Table 1. The estimations of the remaining part of the casting film 16 on the belt 36 was:

A: when there was no remaining part;

B: when there were remaining pars whose influence on the film production was small and usable;

N: when there were remaining parts whose influence on the film production was large.

TABLE 1

| | Value α | | | |
|---|---|---|---|---|
| | 0.5 | 0.8 | 1.1 | 1.4 |
| Remaining Part | A | A | B | N |

Table 1 teaches that the distribution pin in which the value α is adequately predetermined prevents the part of the casting film from remaining on the belt.

About the distribution pins 25, 26, the value α was 1.0, (the width Wd of the groove was 67 mm), and the value β was 0.8 (the depth Dd of the groove was 1.3 mm). Further, the coefficient p was 0.04, 0.08, 0.12 and 0.16, and the coefficient q was 1.0. The results of the experiment under these conditions are shown in Table 2.

About the distribution pins 25, 26, the value a was 1.0, (the width Wd of the groove was 67 mm), and the value β was 0.8 (the depth Dd of the groove was 1.3 mm). Further, the coefficient p was 0.08, and the coefficient q was 0.12, 0.5, 1.0 and 1.6. The results of the experiment under these conditions are shown in Table 3.

The estimations of the remaining part of the casting film 16 on the belt 36 was:

A: when there was no thickness unevenness (or thickness mura);

B: the thickness unevenness was small and the film was usable;

C: when the thickness unevenness was large.

TABLE 2

| | Coefficient p | | | |
|---|---|---|---|---|
| | 0.04 | 0.08 | 0.12 | 0.16 |
| Thickness Unevenness | N | A | A | N |

TABLE 3

| | Coefficient q | | | |
|---|---|---|---|---|
| | 0.12 | 0.5 | 1.0 | 1.6 |
| Thickness Unevenness | N | A | A | N |

Tables 2 & 3 teach that when the distribution pins in which the values p, q are adequately predetermined are use, the thickness of each layer is uniform and the film production can be made.

Various changes and modifications are possible in the present invention and may be understood to be within the present invention.

What is claimed is:

1. An apparatus for producing a multi-layer film, comprising:
   a feed block for joining at a joining section a first polymer solution and a second polymer solution that flow in different flow paths, so as to form and feed out a casting polymer solution stream through a path exit, said second polymer solution having lower viscosity than said first polymer solution, said first and second polymer solutions flowing in parallel to each other in said casting polymer solution stream;
   a casting die for extending a width of a casting polymer solution stream fed out from said feed block and for casting said casting polymer solution stream through a die lip onto a support after the extending, so as to form a casting film having a multi-layer structure;
   an edge slitting device for slitting off edge portions of said casting film in a widthwise direction thereof, to obtain a production area of said casting film;
   a distribution pin provided in said joining section in said feed block;
   a groove formed on said distribution pin, for controlling a flowing width of said second polymer solution when said second polymer solution flows in said groove;
   wherein a width Wd and a depth Dd of said groove satisfies following formulae (1) and (2), $0.6(Wa\ Wc/Wb) < Wd < 1.14(Wa\ Wc/Wb)$ $0.5(Da\ Dg/Df) < Dd < 3.2(Da\ Dg/Df)$ Wa: width of said path exit
   Wb: width of said casting film,
   Wc: width of the production area of said casting film
   Da: depth of said path exit
   Df: thickness of layer formed from said first polymer film in said casting film
   Dg: thickness of layer formed from said second polymer film in said casting film,
   wherein said groove is constructed of a first groove area having said width Wd and said Depth Dd and a second groove formed in a middle of said first groove in a widthwise direction of a bottom of said first groove, and
   wherein a width We and a depth De of said second groove satisfy following formula (3), (4):

$0.05Wd < We < 0.15Wd,$ $0.15Dd < De < 1.5Dd.$

2. An apparatus claimed in claim 1, wherein said distribution pin is columnar, and said groove is formed on a periphery of said distribution pin.

3. An apparatus claimed in claim 2, wherein said distribution pin is rotatable, and said second polymer solution passes part of said groove.

4. An apparatus claimed in claim 3, wherein said width Wd of said groove varies in a rotational direction of said distribution pin, and a rotation of said distribution pin changes said width Wd of said part for controlling a flowing width of said second polymer solution.

* * * * *